United States Patent [19]

Dinh

[11] Patent Number: 4,656,929
[45] Date of Patent: Apr. 14, 1987

[54] COOKING UTENSIL FOR DEEP FAT FRYING OF FOOD ITEMS

[76] Inventor: Tri T. Dinh, R.R. #2, Lot 24, N. Haven Trailer Ct., Muscatine, Iowa 52761

[21] Appl. No.: 800,759

[22] Filed: Nov. 22, 1985

[51] Int. Cl.<sup>4</sup> ............................................. A47J 37/12
[52] U.S. Cl. ..................................... 99/407; 99/426; 99/441; 99/448; 99/450; 294/50
[58] Field of Search .................. 99/407, 426, 441, 448, 99/450, 410, 416, 449; 294/26.5, 50; 426/523

[56] References Cited

U.S. PATENT DOCUMENTS

| | | |
|---|---|---|
| 137,142 | 3/1873 | Machlet . |
| 1,266,912 | 5/1918 | Bradbury . |
| 1,462,105 | 7/1923 | Hart ........................................ 99/407 |
| 1,470,521 | 10/1923 | Combest . |
| 1,543,380 | 6/1925 | Harrell . |
| 1,870,735 | 8/1932 | Jones et al. . |
| 2,267,213 | 12/1941 | Newcomb . |
| 2,419,674 | 4/1947 | Caplan ................................ 99/416 X |
| 2,506,305 | 5/1950 | Maldonado . |
| 2,570,374 | 10/1951 | Pompa ................................ 99/450 X |
| 2,773,442 | 12/1956 | Contreras . |
| 2,804,530 | 8/1957 | McGuinness ..................... 99/441 X |
| 2,897,745 | 8/1959 | Nichols et al. . |
| 3,669,002 | 6/1972 | Davidson . |
| 3,759,165 | 9/1973 | Wallace ............................. 99/416 X |
| 4,173,926 | 11/1979 | Brignall . |
| 4,483,240 | 11/1984 | Dinh ..................................... 99/407 |

FOREIGN PATENT DOCUMENTS

| | | | |
|---|---|---|---|
| 276438 | 7/1914 | Fed. Rep. of Germany ........ 99/449 |
| 747884 | 6/1933 | France ................................. 99/426 |

Primary Examiner—Billy J. Wilhite
Attorney, Agent, or Firm—Zarley, McKee, Thomte, Voorhees & Sease

[57] ABSTRACT

An improved cooking utensil for the deep fat frying of food items including at least one food holding container having a movable portion which is responsive to a movable portion control means and moves from a closed position in alignment with adjacent portions of said food holding container to an open position away from said food holding container so that food items can be more easily removed from said food holding container after deep fat frying. Piston members responsive to piston control means can optionally be included within the food holding container to push the food items out of the food holding container after deep fat frying. A plurality of food holding containers can be utilized to deep fat fry a plurality of food items and the shape of the food holding containers can be varied to produce various shaped food items.

14 Claims, 16 Drawing Figures

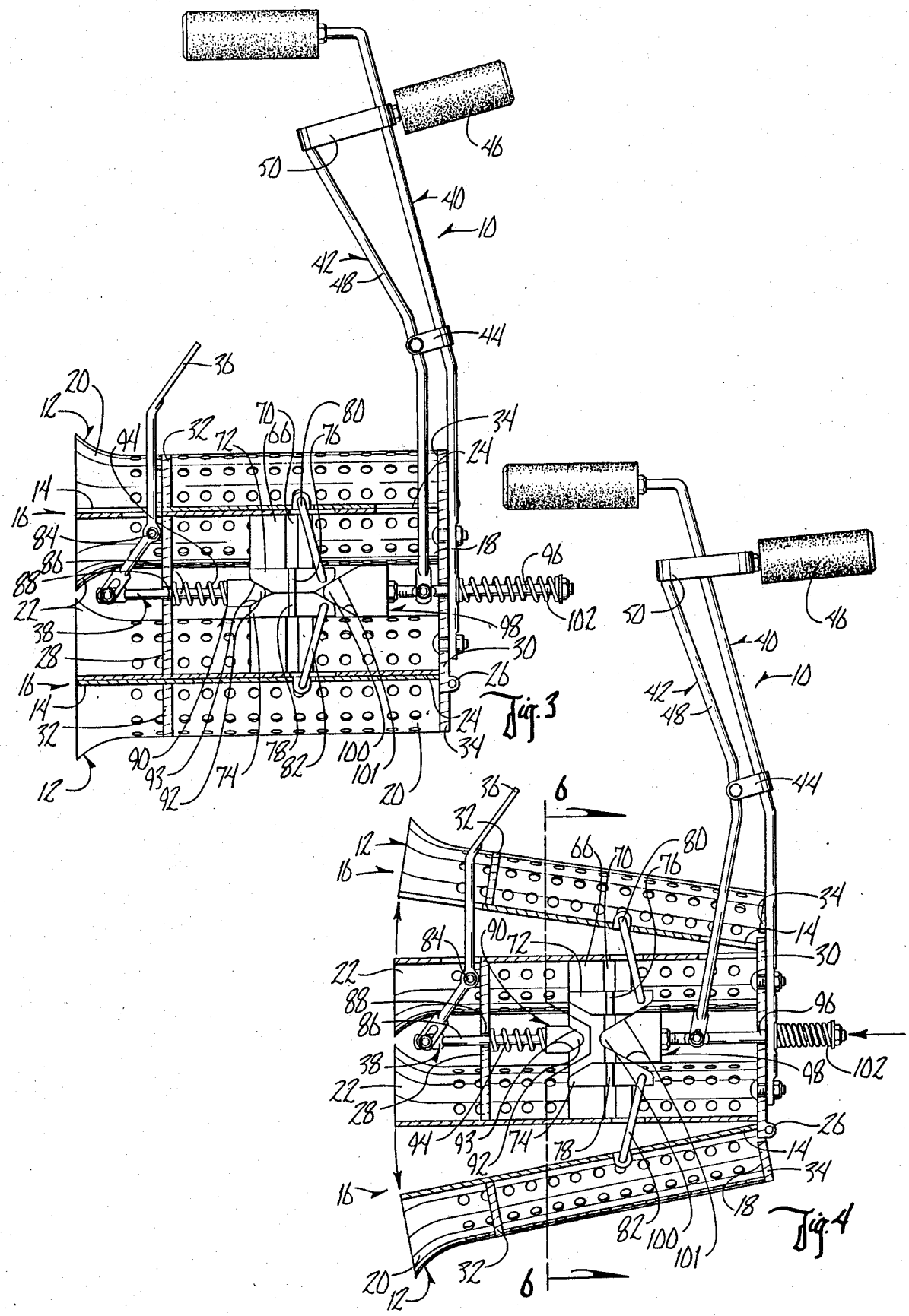

COOKING UTENSIL FOR DEEP FAT FRYING OF FOOD ITEMS

BACKGROUND OF THE INVENTION

1. Field of the Invention

This invention relates to cooking utensils, and in particular, cooking utensils for the deep fat frying of food items such as, but not limited to, spring rolls and the like and for easy removal of the same.

2. Problems in the Art

The deep fat frying of food items is at the same time cumbersome, tedious, and potentially dangerous. Each food item to be deep fat fried must be inserted into the liquid frying medium, exposed on all surfaces to the liquid frying medium for a sufficient length of time, and then removed, all the time subjecting the user to the hazards of the boiling fluid frying medium.

In my U.S. Pat. No. 4,483,240, I disclose an advantageous deep fat frying cooking utensil which improves greatly over the art. A food holding container has an opening for insertion of the food item and is placable within the liquid frying medium allowing full submersion and contact with the frying medium while greatly reducing the danger of burns or scalding to the user. Additionally, means are disclosed which assist in removing the deep fat fried food items from the food holding container once cooked, as the food items generally expand in the high temperatures of the liquid frying medium.

Problems still exist even with my patented invention. Because of the expansion and the generally adhesive qualities of the food items which are traditionally deep fat fried, many times the food items become lodged, even semi-adhesively to the interior of the food holding containers. Additionally, because of expansion of the food items, both by heat, frying, and steam expansion from within, the fried food items simply become wedged within the food holding containers. It has therefore been found that it would be advantageous for a deep fat frying cooking utensil to have a food holding container or containers which can be expanded after deep fat frying to allow easier removal of the food items. It has further been found that such expansion of the food holding containers may be even more advantageous than utilizing pistons to push out the food items.

A preferred embodiment would incorporate both the food item pushing pistons and expandable food holding containers which allows easy removal of the food items and also minimizes the requirement of direct handling of the food items which are extremely hot and hazardous after deep fat frying.

It is therefore a primary object of the invention to improve over or solve the problems in the art.

A further object of the invention is to provide an improved cooking utensil for the deep fat frying of food items which allows easy removal of the food items after deep fat frying.

Another object of the invention is to provide an improved cooking utensil for deep fat frying of food items which provides a safe and efficient method of deep fat frying.

Another object of the invention is to provide an improved cooking utensil for deep fat frying of food items which is portable, hand operated, and easy to use and maneuver.

Another object of the invention is to provide an improved cooking utensil for the deep fat frying of food items which allows for the multiple concurrent deep fat frying of a plurality of food items and subsequent easy removal of the same.

A further object of the invention is to provide an improved cooking utensil for the deep fat frying of food items which is economical and durable.

Further objects, features, and advantages of the invention will become apparent with reference to the accompanying specification and drawings.

SUMMARY OF THE INVENTION

This invention utilizes at least one food holding container which has an opening for the insertion of a food items to be deep fat fried. The food holding container has means for allowing the fluid frying medium to contact all or most of the portions of the food item while retaining the food item. The food holding container is insertable into the fluid frying medium with the food item inside and then is removable and allows easy removal of the deep fat fried food item. This is accomplished by including on the food holding container a movable portion which is operatively connected to a movable portion control means so that when the food holding container is removed from the fluid frying medium, the movable portion control means is operated to move the movable portion from a closed to an open position, thereby providing improved access and improved ability to either allow the food item to slide out of the food holding container or to manually remove it.

A plurality of food holding containers, each with a movable portion operatively connected to a movable portion control means can be utilized so that the concurrent deep fat frying of number of food items can take place. In the preferred embodiment, the movable portion is simply hinged to the remaining portion of the food holding container and is responsive to the movable portion control means which can take the form of a lever or other actuator and can extend away from the food holding container or containers on a handle to reduce chances of contact with the fluid frying medium or the hot food holding container.

Additionally, the food holding containers can include pistons movable along their interior and responsive to a piston control means. This pistons can mechanically eject and further assist in removing food items after deep fat frying. The pistons can be operated either concurrently or separately from the opening of the movable portions of the food holding container.

The food holding containers can also be of any number and of any of various shapes and sizes. Two preferred embodiments are round-in-cross section or rectangular-in-cross section. Other shapes such as triangular, eliptical, and the like can be utilized.

BRIEF DESCRIPTION OF THE DRAWINGS

FIG. 3 is a sectional view taken along lines 3—3 of FIG. 1.

FIG. 4 is the view of FIG. 3 including operation of the movable portion control means showing the opening of the movable portions of the food holding containers.

DETAILED DESCRIPTION OF THE PREFERRED EMBODIMENT

Figure 1:
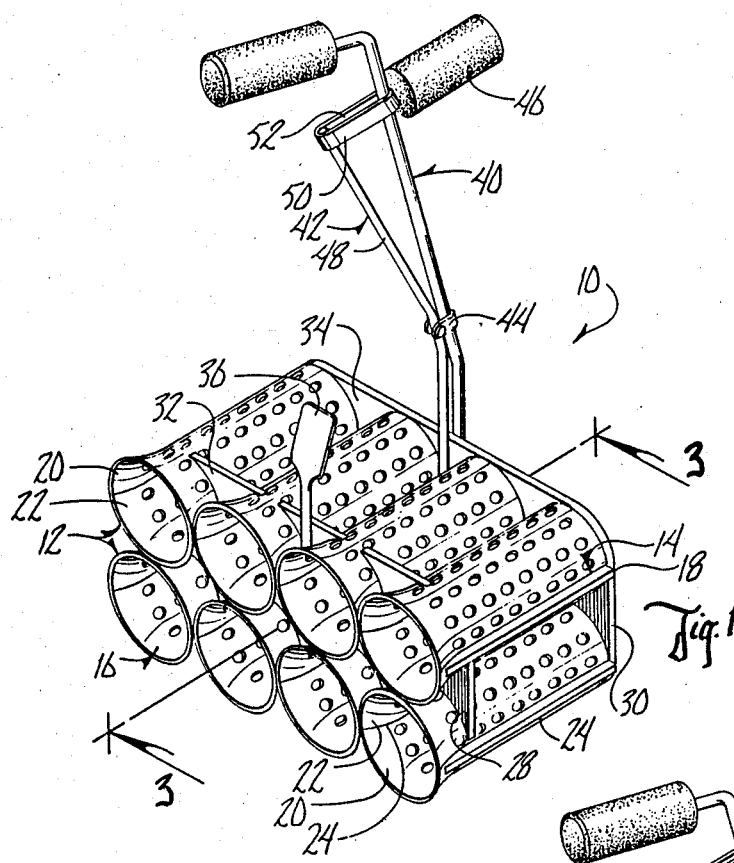
FIG. 1 is a perspective view of one embodiment of the invention.

In reference to the drawings, in particular FIG. 1, there is shown an improved cooking utensil 10 for deep fat frying food objects. In the embodiment shown in FIG. 1, eight food holding containers 12 are secured by framework 14 in two rows. Food holding containers 12 are round-in-cross-section tubes having open front ends 16 and closed rear ends 18. Additionally, food holding containers 12 are comprised of movable portions 20 (upper halves of top row containers) and movable portions 22 (lower halves of bottom row containers) separated along their longitudinal axes by split lines 24.

In the top row upper halves or movable portions 20 are hingeable upwardly, whereas in the bottom row lower halves or movable portions 22 are hingeable downwardly. Hinges 26 (see FIGS. 3 & 4) allow such movement.

Framework 14 consists of center supports 28 and 30 which secure the non-movable portions of food holding containers 12 to one another. On the other hand, movable portion supports 32 and 34 secure the movable portions 20 and 22 (upper halves in the top row and lower halves in the bottom row) of food holding containers 12 to one another.

Hinges 26 therefore secure the movable portions 20 and 22 to center support 30 to integrate food holding containers 12 into one unit.

Food holding containers 12 have the movable portions 20 and 22 to allow for the easier removal of food items after deep fat frying. Additionally, it may also be helpful in inserting food items before frying. Movement of the movable portions 20 and 22 is accomplished in the embodiment of FIG. 1 by alternative means. A control lever 36 is hingeably secured to the non-movable portions of food holding containers 12 and has connecting means 38 (see FIGS. 3 & 4) operatively connected to it which cause movable portions 20 of the top row and movable portions 22 of the bottom row to hinge open when control lever 36 is moved from a first position to a second position. Control lever 36 is shown in the first position in FIG. 1.

Alternatively, handle 40, secured to center support 28, also has hingeably secured to it a second control handle 42. Second control handle 42 is hingeably secured at hinge member 44 and has a hand gripping portion 46 which is slideably movable in relation to handle rod 48 of handle 40 by means of elongated piece 50 having channel 52 therein. By pulling hand gripping portion 46 away from handle rod 48, the same function of opening food holding containers 12 is accomplished as is done by moving control lever 36.

It is to be understood that either control lever 36 or second control lever 42 can be incorporated in the invention alone. The advantage of second control lever 42 is that the user can operate the opening of food holding containers 12 at a distance away from the hot fluid frying medium or the hot food holding containers 12. It is further to be understood that both control lever 36 and second control lever 42 can be spring biased so that once they are released from their open position the movable portions of food holding containers 12 will reclose.

Figure 2:
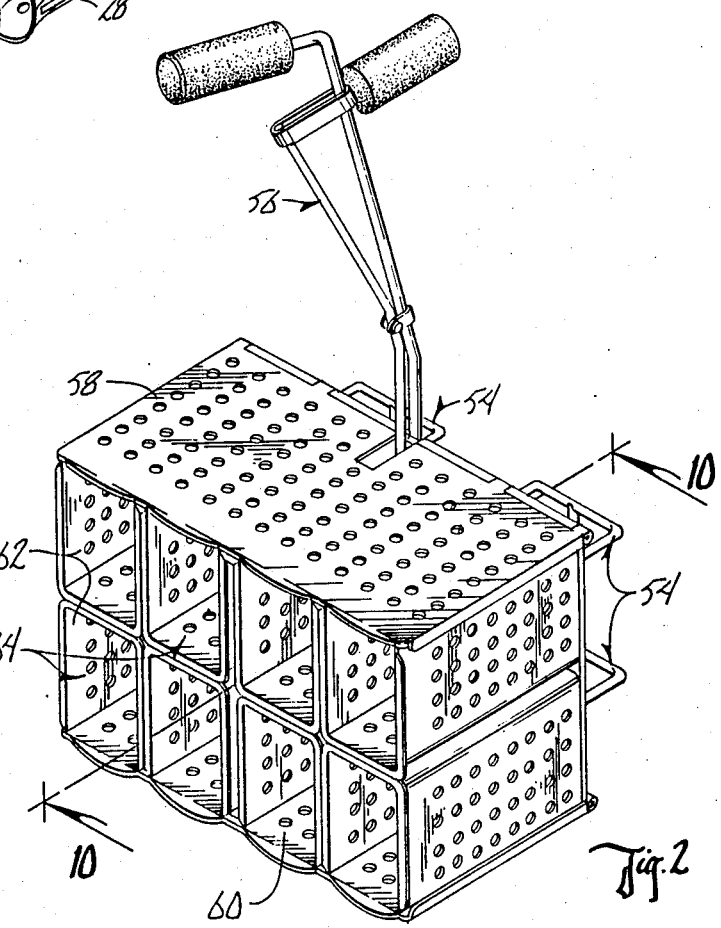
FIG. 2 is a perspective view of a second embodiment of the invention.

FIG. 2 depicts an alternative embodiment of the invention. The same general structure and operation applies as did with the embodiment in FIG. 1. Differences of the embodiment in FIG. 2 include the addition of pistons 54 (similar to those shown in FIG. 9) to further help in removing food items from cooking utensil 10. Second control handle 56 in the embodiment of FIG. 2 performs a dual function of opening movable portions or lids 58 and 60 from square-in-cross-section food holding containers 62 and causing pistons 54 to move inwardly in square food holding containers 62 to push food items out of opening 64.

By referring to FIGS. 3 and 4, the specific mechanism for opening food holder containers 12 for the embodiment of FIG. 1 is specifically shown. A wall member 66 and an identical wall member 68 are secured to center opposite adjacent food holding containers 12 in a parallel relationship. Each wall member 66 and 68 has an identical channel or groove 70 extending along its vertical length. Upper and lower runners 72 and 74 have keys 76 and 78 which are slideably mateable in corresponding channels 70.

Upper runner 72 is connected to movable portion 20 of food holding container 12 by means of pivoting bar 80 which is pivotable at each of its ends. In kind, lower runner 74 is connected to movable portion 22 of food holding container 12 by pivoting bar 82.

As can be seen by comparing FIGS. 3 and 4, by pushing upper and lower runners 72 and 74 vertically apart, this vertical movement is transmitted by pivoting bars 80 and 82 to movable portions 20 and 22 of food holding containers 12, thus accomplishing the opening function of the invention. As previously explained, the opening can be accomplished either by control level 36 or second control lever 42.

Control lever 36 is pivotally attached by pivot 84 to center support 28. A plunger rod 86 extends through aperature 88 in center support 28 between runners 72 and 74 and the lower end of control lever 36. Plunger rod 86 is pivotably connected at one end to control lever 36 and has a plunger head 90 with pointed end 92 extending inbetween upper and lower runners 72 and 74. Note the sloped faces 93 of runners 72 and 74 which receive pointed end 92 of plunger 90 and allows gradual opening of movable portions 20 and 22.

By pulling control lever 36 from its first position as shown in FIG. 3, to the left to a second position, causes pointed end 92 to spread apart upper and lower runners 72 which as a result cause movable portions 20 and 22 to open. Spring 94 is extended by this movement and release of control lever 36 causes plunger head 90 to be withdrawn back to the left thereby pulling food holding containers 12 back together.

Similarly, second control handle 42 is pivotably connected at its lower end to a plunger rod 96 having a plunger head 98 and pointed end 100 abutting sloped faces 101 on the other sides of upper and lower runners 72 and 74. A spring 102 is located to the right of food holding containers 12 and functions the same as spring 94.

It is therefore seen that operation of either control lever 36 or second control lever 42 can cause the opening of food holding containers 12. In the embodiment shown in FIGS. 3 and 4, plunger head 98 is larger in vertical size than plunger head 90 and therefore allows proportionally greater opening of food holding containers 12. The size of the plunger heads can be varied according to desire. Reference to FIG. 4 shows the situation where second control lever 42, by virtue of moving hand gripping portion 46 to the right causes the larger plunger head 98 to force upper runner 72 away from lower 74 and open food holding containers 12. Hinges 26 can be specifically seen between movable portions 20 and 22 of food holding containers 12.

Figure 5:
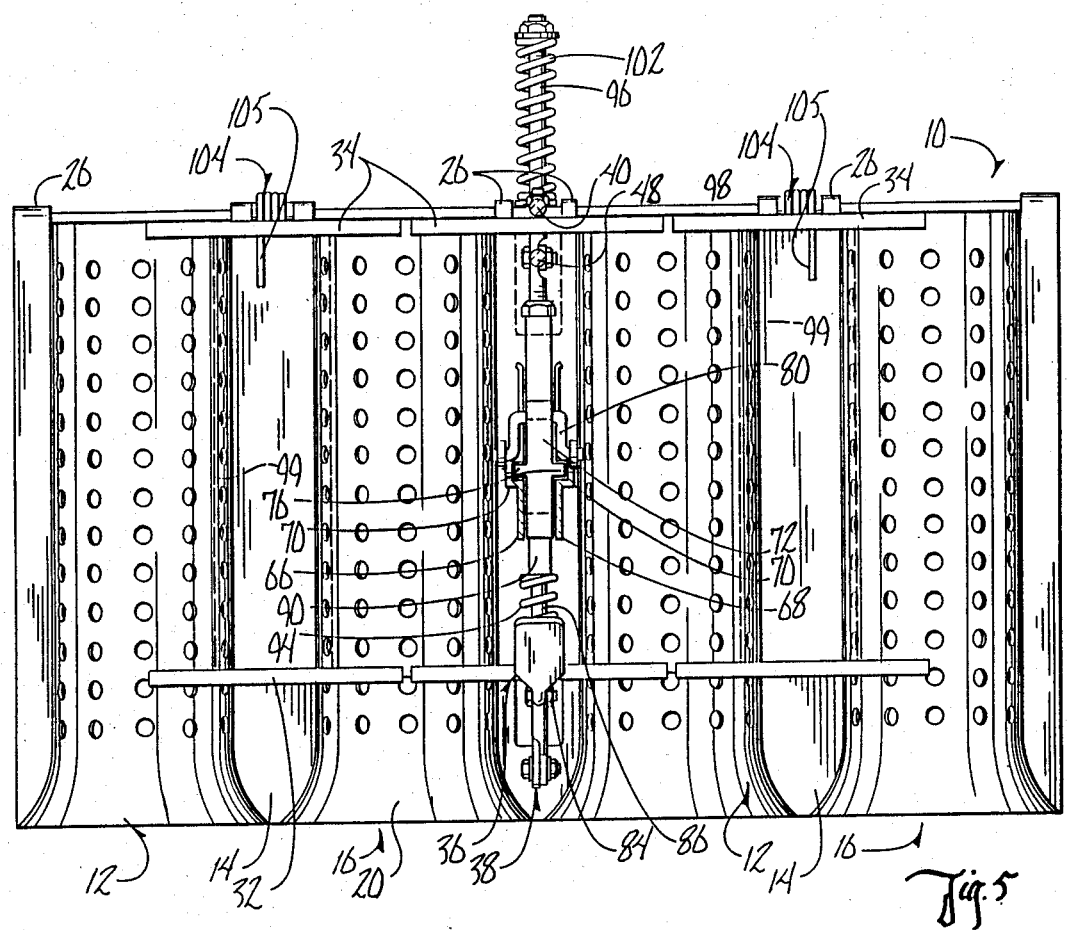
FIG. 5 is a top view of an embodiment of the invention.

FIG. 5 shows a top view of both means for opening food holding containers 12. Additionally, center supports 28 and 30 are clearly shown as are hinges 26.

Figure 6:
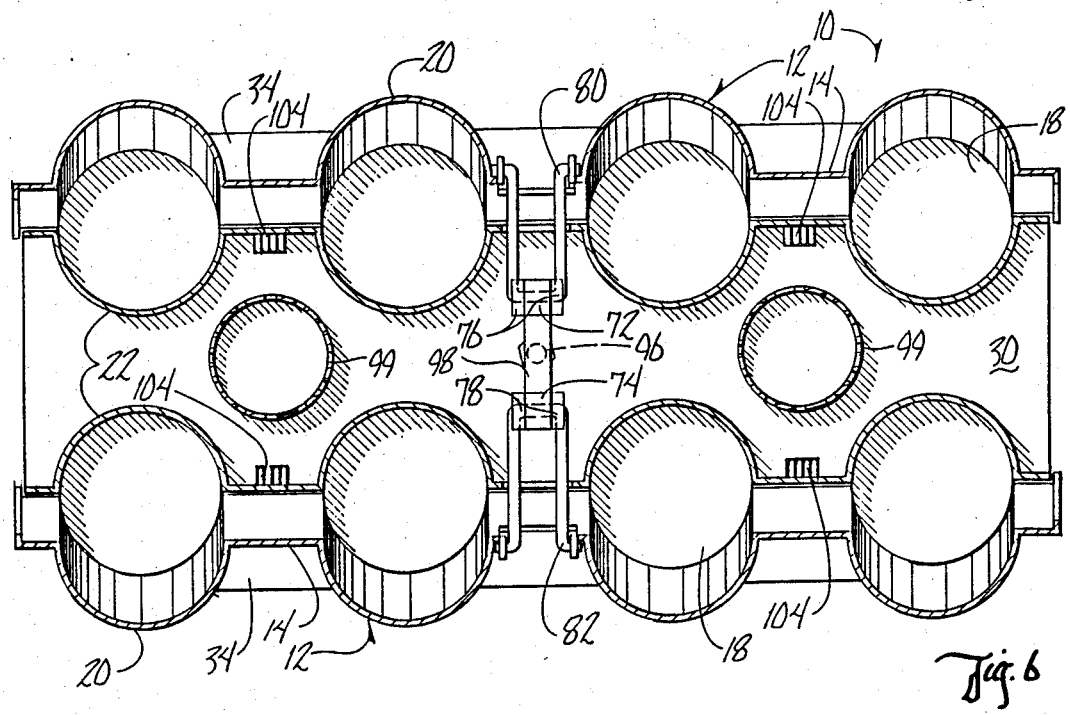
FIG. 6 is a sectional view taken along lines 6—6 of FIG. 4.

In contrast, FIG. 6 clearly depicts the pivot bars 80 and 82 and how they operate to open food holding containers 12 which are shown opened. Support tubes 99 extend between front and back center supports 28 and 30 and are simply open-ended tubes.

Figure 7:
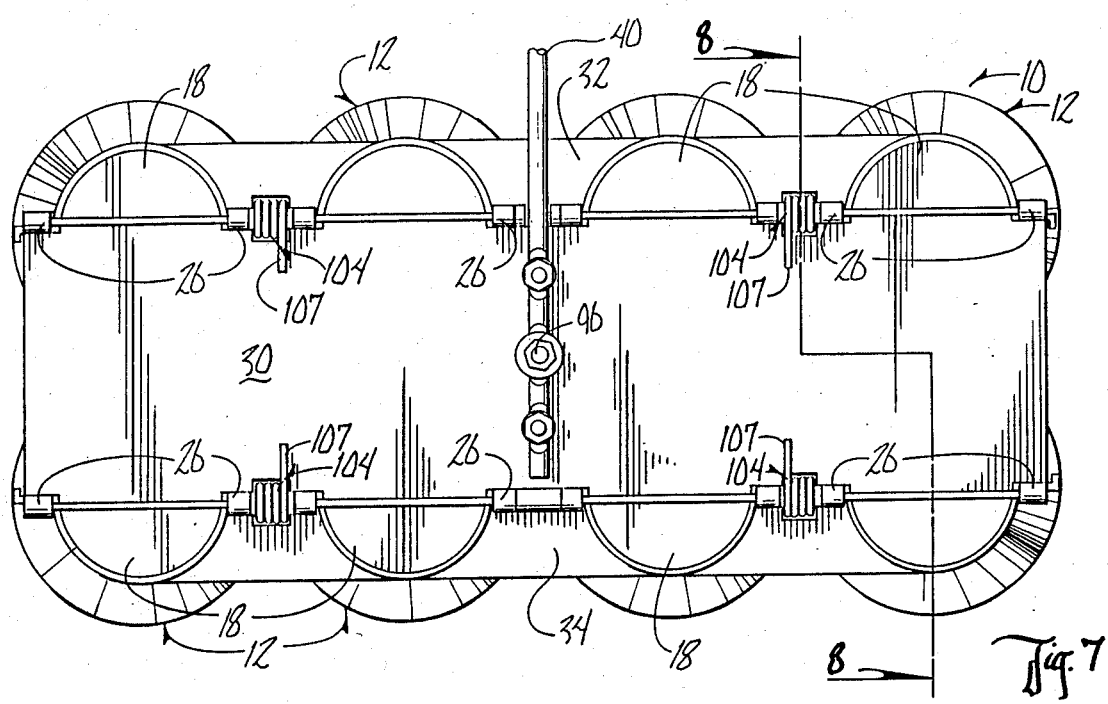
FIG. 7 is a rear view of the embodiment of FIG. 3.

FIG. 7 shows clearly hinges 26 for both rows of food holding containers 12, and the method of attachment of handle 40 to center support 30. Also torsion springs 104 can be seen which wrap around hinges 26 and have extended ends 105 and 107 which abutt respectively plates 109 (see FIG. 5) and center support to constantly bias movable portions 20 and 22 together when either control lever 36 or second control handle 42 are not operated.

Figure 8:
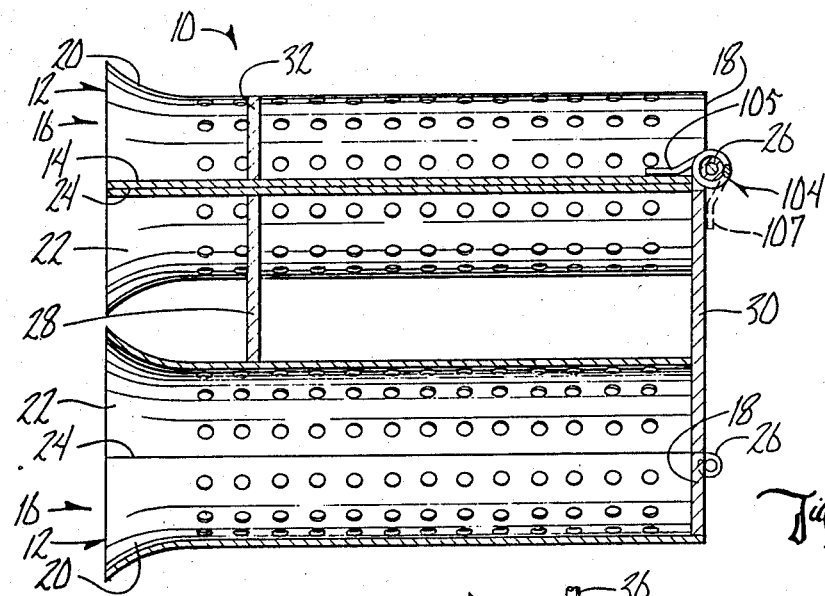
FIG. 8 is a sectional view taken along lines 8—8 of FIG. 7.

FIG. 8 depicts the hinged orientation of movable portions 20 and 22 for both rows of food holding containers 12.

Figure 9:
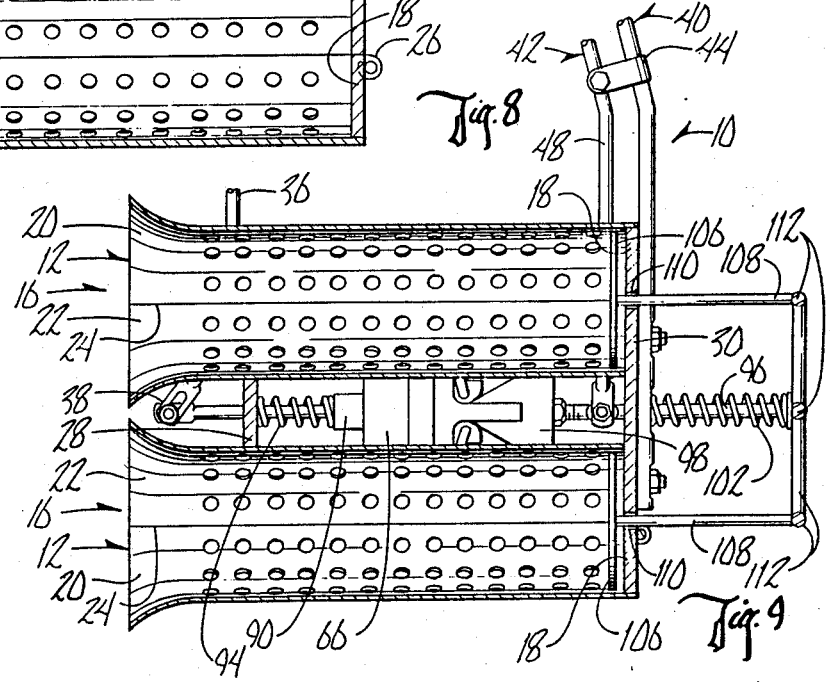
FIG. 9 is a sectional view of an alternative embodiment of the invention which additionally includes piston members and the control means for the piston members.

FIG. 9 depicts an additional optional feature of the invention as is disclosed in my U.S. Pat. No. 4,483,240. Piston heads 106 are positioned within the back ends of food holding containers 12 and have piston rods 108 extending through aperatures 110 being connected outside of food holding containers 12 by cross rods 112. Cross rods 112 are in turn interconnected to plunger rod 96. It therefore can be seen that when second control lever 42 is operated to open food holding containers 12, concurrently, the movement of plunger rod 96 inwardly causes piston heads 106 to move to the left within food holding containers 12, thereby providing a pushing action for the assistance of pushing out any food items in food holding containers 12.

Figure 10:
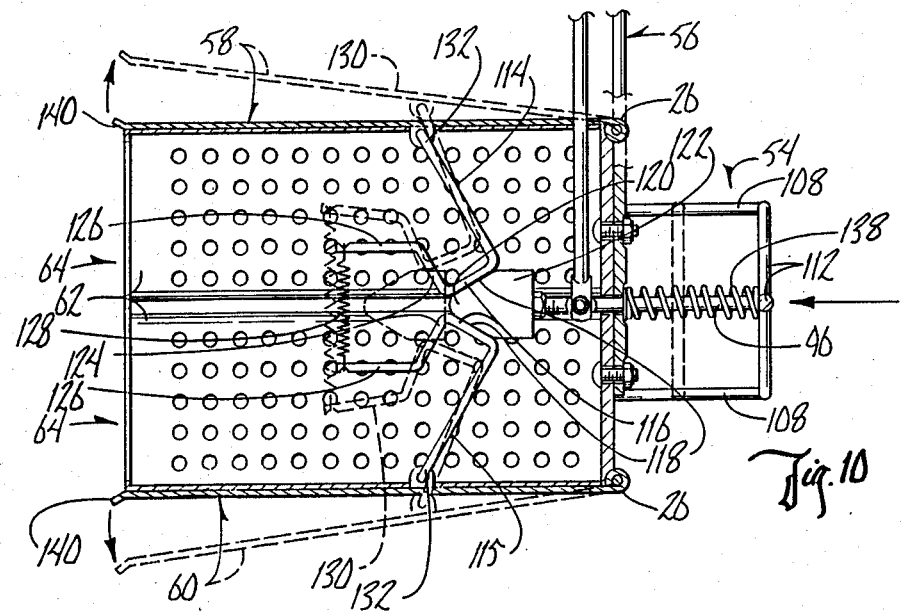
FIG. 10 is a sectional view along lines 10—10 of FIG. 2.

FIG. 10 depicts an alternative embodiment of a mechanism for opening food holding containers 12. This embodiment is depicted in association with the rectangular-in-cross section food holding containers 62 of FIG. 2. In this embodiment, instead of wall member 68 with channels 70, pivot bars 114 and 116 are bent having portions 116 with in the closed position follow the sloping faces 118 of pointed end 120 of plunger head 122. Adjacent portions 124 of pivot bars 114 and 115 then angle oppositely away from one another to parallel portions 126 which are interconnected by spring 128. As is shown by the dashed lines 130 in FIG. 10, by operating second control handle 42 to move plunger head 122 to the left, forces pivot bars 114 and 115 apart. The outer ends 132 of pivot bars 114 and 115 are attached to top and bottom lids or movable portions 134 and 136 respectively and move them outwardly in kind.

The compression of spring 138 during opening of top and bottom lids 134 and 136 causes lids 134 and 136 to close once second control lever 42 is released.

Figure 11:
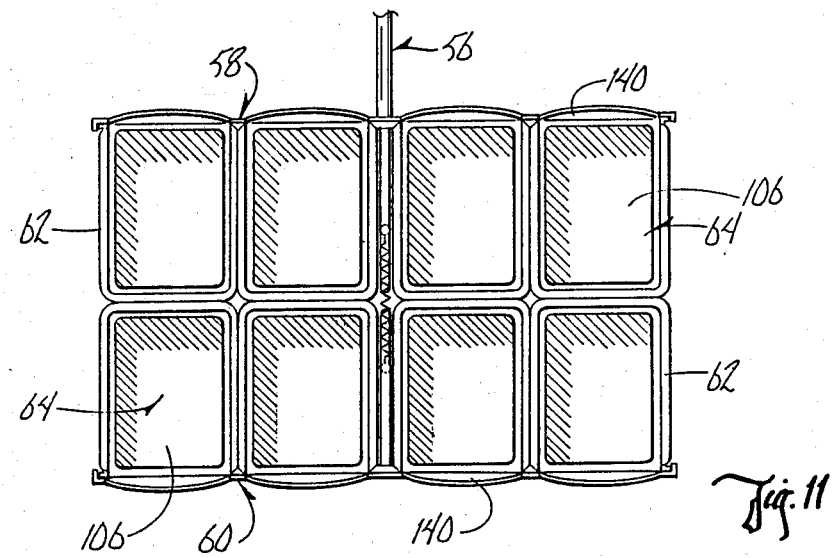
FIG. 11 is a front view of the invention of FIG. 2.
Figure 12A:
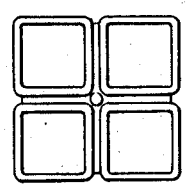
FIGS. 12A-D are representative front elevational views of alternative food holding container shapes and configurations according to the invention.
Figure 12B:
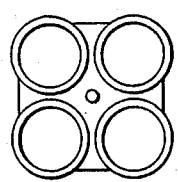
Figure 12C:
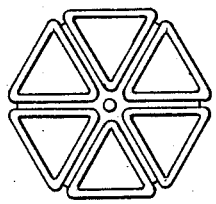
Figure 12D:
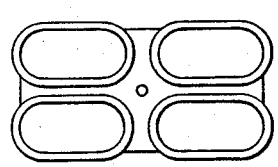

FIG. 11 shows a front view of food holding container 62. It is noted that the lips 140 of top and bottom lids 134 and 136 can be arcuately shaped to help facilitate insertion and removal of food items.

FIGS. 12A-D show a few alternative examples of different shapes for food holding containers 12 for use according to the invention. In each of these examples, the food holding containers 12 can be split and the movable portions hingeably movable in response to a control lever as explained above.

Figure 13:
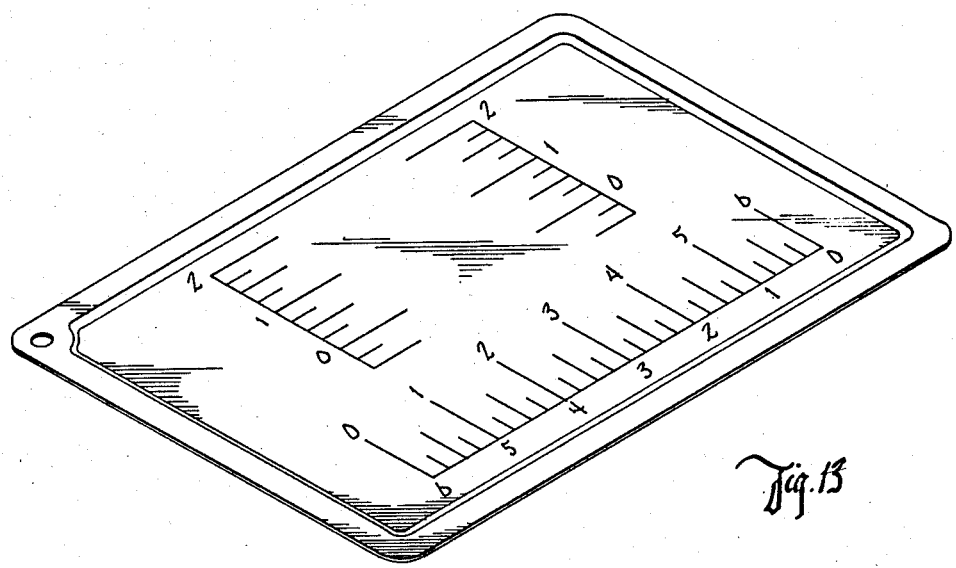
FIG. 13 shows a measuring device for determining length, width, and/or diameter of the food items to be fried.

FIG. 13 depicts a measurement tray 142 which contains measured markings 144 and 146 to determine length, width, and/or diameter of food items prior to insertion in food holding containers 12 to ensure that they will fit and to achieve uniformity in the food item size.

Operation of the invention has been set forth above. It will be appreciated that the present invention can take many forms and embodiments. The true essence and spirit of this invention are defined in the appended claims, and it is not intended that the embodiment of the invention presented herein should limit the scope thereof.

Alternatively, for example, spring 94 as in FIG. 3 could function to constantly urge plungerhead 90 towards runners 72 and 74 so that if handle 42 is operated to open moveable portions 20 and 22 wide (as in FIG. 4), spring 94 would then move plungerhead 90 into the gap between runners 72 and 74 in FIG. 4. Then when handle 42 is released, runners 72 and 74 would move towards each other but be blocked by plungerhead 90 so that moveable portions 20 and 22 would remain slightly open. This would automatically prepare the device for insertion of the next food items to be deep fat fried. By moving handle 36 accordingly, moveable portions 20 and 22 could be completely closed again.

What is claimed is:

1. An improved cooking utensil for the deep fat frying of food items comprising:

a food holding container defining a food holding cavity and having an opening for insertion and removal of said food item and having at least one movable portion which can be moved away from said food holding container;

a movable portion control means attached to said movable portion of said food holding container to control the movement of said movable portion over a range of positions from a closed position in alignment with adjacent portions of said food holding container to closely surround and contain said food item during deep fat frying, to an open position away from said food holding container and said food holding cavity, so that said food item can more easily be inserted into and removed from said food holding container when said movable portion of said food holding container is moved to said open position;

said movable portion control means including a lever means which is operatively connected to the movable portion of the food holding container by a linkage means, movement of said lever means in a pre-determined direction causing movement of the movable portion away from the food holding container.

2. The device of claim 1 further comprising a plurality of food holding containers each having a movable portion movable between said closed position and said open position in response to said movable portion control means.

3. The device of claim 2 wherein said plurality of food holding containers are arranged in one or more rows.

4. The device of claim 2 wherein each movable portion is interconnected together by interconnecting means allowing simultaneous movement of all movable portions in response to the movable portion control.

5. The device of claim 4 wherein said lever means is operatively connected to at least one movable portion of a food holding container by said linkage means so that movement of said lever means in said predetermined direction causes movement of all movable portions away from the corresponding food holding containers.

6. The device of claim 1 wherein said movable portion is hingeably attached to said food holding container.

7. The device of claim 6 wherein said movable portion is hingeably attached at a first end of said food holding container opposite a second end of said food holding container having said opening.

8. The device of claim 1 wherein said food holding container comprises a tube with an end opposite said opening being closed, said tube being split in half down its longitudinal axis, one half of said tube comprising said movable portion.

9. The device of claim 1 wherein said food holding container comprises a rectangular-in-cross section tube, an end opposite said opening being closed and one side of said tube comprising said movable portion.

10. The device of claim 1 wherein said movable portion control means further comprises a biasing member operably connectable to said movable portion and which biases said movable portion to said closed position when said control means has no manual force applied against said biasing member.

11. The device of claim 1 further comprising a piston member slidably movable within the interior of said container, said piston member having an end portion which abuts said food item when inserted in said food holding container and a connecting portion which is attached to said end portion at one end and extends outwardly from said end portion, and a piston control means attached to said connecting portion to control the slidable movement of said end portion of said piston member within said container over a range of positions from a first position farthest away from said opening to a second position closer to said opening so that said food will at least partially be ejected out said opening upon movement of said piston member to said second position.

12. The device of claim 11 further comprising a plurality of food holding containers each with a piston member and a movable portion, each piston member responsively controllable by said piston control means, each movable portion responsibly controllable by said movable portion control means.

13. The device of claim 11 wherein said piston control means and said movable portion control means are interconnected so that movement of said piston control means from said first to said second position causes concurrent corresponding movement of said second control means from said closed to said open positions.

14. The device of claim 13 wherein said piston control means is secured to a handle means extending away from said food holding container.

* * * * *